3,203,982
PROCESS FOR HYDROGENATING DIARYL-
KETONE CARBOXYLIC ACIDS
John H. McCracken, Monroeville, and Johann G. D.
Schulz and Arthur C. Whitaker, Pittsburgh, Pa., as-
signors to Gulf Research & Development Company,
Pittsburgh, Pa., a corporation of Delaware
No Drawing. Filed Nov. 30, 1960, Ser. No. 72,581
4 Claims. (Cl. 260—515)

This invention relates to a process for hydrogenating a diarylketone carboxylic acid.

Diarylketone carboxylic acids which can be hydrogenated in accordance with the procedure of this invention can be represented in general by the following structural formula:

wherein $R_1$ and $R_2$, the same or different, are aryl radicals containing one or more rings, at least one of which is an aromatic ring, such as phenyl, biphenyl, naphthyl, phenanthryl, anthryl, indyl, dihydronaphthyl, cyclohexylphenyl, etc., carrying a carboxyl group, said carboxyl groups preferably being symmetrically arranged on said aromatic rings, said aryl radicals carrying as nuclear substituents 0 to four radicals selected from the group consisting of primary, secondary and tertiary alkyls having from one to 16 carbon atoms, preferably from one to eight carbon atoms, such as methyl, ethyl, n-propyl, isopropyl, isobutyl, amyl, isoamyl, hexyl, isooctyl, decyl, tetradecyl, hexadecyl, etc., F, Cl, Br, I, COOR (where R is an alkyl group), $NH_2$, OH, etc. Specific examples of diarylketone carboxylic acids which can be hydrogenated in accordance with the process are benzophenone-4,4'-dicarboxylic acid, benzophenone-2,4'-dicarboxylic acid, benzophenone-2,4,2',4'-tetracarboxylic acid, 2-chlorobenzophenone-4'-carboxylic acid, dinaphthyl ketone dicarboxylic acid, 2-fluoro-4-methyl benzophenone-4'-carboxylic acid, alpha-benzoyl-beta-naphthoic acid, 9-(1-decyl-10-carboxyphenanthryl) 4-(5-isooctyl-3-carboxybiphenyl) ketone, 1-[2-cyclohexyl-4-carboxyphenyl] 8 - (1,2,3,4-tetrahydro-7-carboxynaphthyl) ketone, etc.

The process of this invention is particularly applicable in the hydrogenation of a symmetrical diarylketone carboxylic acid, such as benzophenone-4,4'-dicarboxylic acid, prepared in accordance with the procedure set forth in copending application Serial No. 822,415, filed in the names of John H. McCracken and Johann G. D. Schulz on June 24. 1959. By "symmetrical" we mean an arrangement where the aryl radicals are identical to each other. Briefly in the process of the application a 1,1-diarylalkane, such as 1,1-di(para)tolylethane, is oxidized with nitric acid having a concentration of about five to about 70 percent at a temperature of about 110° to about 350° C. and a pressure of about atmospheric to about 500 pounds per square inch gauge for about one minute to about 48 hours. At the end of this time a solid amorphous diarylketone carboxylic acid, such as benzophenone 4,4'-dicarboxylic acid, precipitates out of the reaction mixture and is recovered.

The diarylketone carboxylic acids defined hereinabove are solids. Difficulty arises in placing the diarylketone carboxylic acid in a suitable form for hydrogenation when the same is a solid compound. Even when the diarylketone carboxylic acid is suspended in a suitable carrier such as water the difficulty is not resolved. Thus, we have suspended 100 grams of benzophenone 4,4'-dicarboxylic acid in 500 grams of water and, together with 20 grams of nickel (Harshaw 0104), subjected the reaction system to a temperature of 250° C. in the presence of hydrogen at a total pressure of 1500 pounds per square inch gauge for one-half hour in a one-liter autoclave and have detected no hydrogenation of said compound.

We have found that the desired hydrogenation can be effected easily by employing a soluble salt of the diarylketone carboxylic acid wherein said salt is selected from the group consisting of the sodium, potassium, lithium, rubidium, cesium, beryllium, magnesium and ammonium salts of the diarylketone carboxylic acid rather than the acid itself. The desired salt can be obtained in any suitable manner but preferably is obtained by reacting the acid with approximately the stoichiometric amount of one of the following compounds: a hydroxide or carbonate of sodium, potassium, lithium, rubidium, cesium, beryllium, magnesium and ammonium at a temperature of about 25° to about 100° C., although greater or lesser amounts of such compound can be employed if desired.

Merely employing the diarylketone carboxylic acid in the form of a soluble salt, however, is not sufficient to place the compound in suitable form for hydrogenation. The salt must first be placed in an aqueous solution. While we are not sure we believe the reason to be that in so doing the salt is ionized and it is the ion remaining which is susceptible to hydrogenation. The amount of water required must be at least sufficient to effect ionization of the salt. Thus at least about 50, preferably about 100 to about 500, percent by weight of water relative to the salt is sufficient depending on the solubility of the salt. Other compounds or materials can also be present in the aqueous solution provided they do not adversely affect the reactants, products or course of the reaction. In addition to water other aqueous solutions which can be employed are methanol, ethanol, propanol, dioxane, tetrahydrofuran, etc.

Hydrogenation catalyst and hydrogen are also added to the aqueous solution described above, and the mixture is then subjected to hydrogenation conditions. Hydrogenation catalysts which can be employed in the process of this invention include cobalt, nickel, and copper chromite. At least about one percent by weight of catalyst relative to the salt, preferably about five to about 20 percent by weight, can be used. Stoichiometric amounts of hydrogen are required for complete conversion to the desired compound. A temperature of about 100° to about 200° C., preferably about 150° to about 200° C. and a pressure of about 300 to about 1000 pounds per square inch gauge, preferably about 500 to about 1000 pounds per square inch gauge are employed. A contact time of about 15 minutes to about 10 hours can be employed. Depending upon the catalyst used and the severity of the hydrogenation conditions in general, the salt of a diarylcarbinol carboxylic acid or a diarylmethane carboxylic acid will be obtained. Thus the use of nickel catalyst results in the production of the salt of a diarylmethane carboxylic acid, while the use of a copper chromite catalyst results in the production of the salt of a diarylcarbinol carboxylic acid.

The hydrogenated product desired will dictate the methods of recovery employed. In the event the hydrogenated salt is desired, the product is subjected to filtration to recover the catalyst therefrom, after which the water is removed by evaporation. To convert the hydrogenated salt to the corresponding acid, it is reacted with an acidic reagent, such as hydrochloric acid, sulfuric acid, acetic acid or phosphoric acid in approximately stoichiometric amounts at a temperature of about 10° to about 100° C. after removal of catalyst therefrom.

The hydrogenated diarylketone carboxylic acids produced by the process herein described can be used as intermediates in the preparation of plastics, plasticizers, and synthetic fibers.

The process of this invention can further be illustrated by reference to the following examples.

*Example I*

One hundred grams of benzophenone 4,4'-dicarboxylic acid were mixed with 29.6 grams of solid sodium hydroxide, and sufficient water was added to the mixture to bring the total volume to 500 milliliters. To this was added 15 grams of copper chromite catalysts. The entire mixture was placed in a one-liter, stainless steel, stirred autoclave which was brought to 1000 pounds per square inch gauge with hydrogen and heated for one hour at 180° C. The autoclave was thereafter cooled to 25° C., depressured and filtered to remove catalyst therefrom. The liquid remaining was mixed with one mol of 10 percent hydrochloric acid. This precipitated the acid which was recovered by filtration. 90 grams of white product analyzing as benzhydrol 4,4'-dicarboxylic acid was found.

*Example II*

The process of Example I was repeated except that 20 grams of nickel catalyst (Harshaw 0104) was employed in place of copper chromite. A white product in the amount of 98 grams analyzing as diphenylmethane 4,4'-dicarboxylic acid was obtained.

Obviously many modifications and variations of the invention as hereinabove set forth can be made without departing from the spirit and scope thereof and therefore only such limitations should be imposed as are indicated in the appended claims.

We claim:

1. A process for hydrogenating a benzophenone carboxylic acid having from one to two carboxylic acid groups on each of the rings of said benzophenone carboxylic acid, said carboxylic acid groups being symmetrically arranged on said rings, at least one of said carboxylic acid groups on each of said rings being in the 4 position relative to the carbonyl of said benzophenone carboxylic acid, which comprises heating an aqueous solution of a salt of said acid wherein said salt is selected from the group consisting of the sodium, potassium, lithium, rubidium, cesium, beryllium, magnesium and ammonium salts of said benzophenone carboxylic acid in the presence of hydrogen and a hydrogenation catalyst selected from the group consisting of cobalt, nickel and copper chromite at a temperature of about 100° to about 200° C., a pressure of about 300 to about 1000 pounds per square inch gauge for about 15 minutes to about 10 hours to obtain a compound selected from the group consisting of the corresponding salt of a diarylcarbinol carboxylic acid and the corresponding salt of a diarylmethane carboxylic acid.

2. A process for hydrogenating benzophenone 4,4'-dicarboxylic acid which comprises heating an aqueous solution of a salt of said acid wherein said salt is selected from the group consisting of the sodium, potassium, lithium, rubidium, cesium, beryllium, magnesium and ammonium salts of said benzophenone carboxylic acid in the presence of hydrogen and a nickel hydrogenation catalyst at a temperature of about 100° to about 200° C., a pressure of about 300 to about 1000 pounds per square inch gauge for about 15 minutes to about 10 hours to obtain the corresponding salt of a diarylmethane carboxylic acid.

3. A process for hydrogenating benzophenone 4,4'-dicarboxylic acid which comprises heating an aqueous solution of a salt of said acid wherein said salt is selected from the group consisting of the sodium, potassium, lithium, rubidium, cesium, beryllium, magnesium and ammonium salts of said benzophenone carboxylic acid in the presence of hydrogen and a copper chromite hydrogenation catalyst at a temperature of about 100° to about 200° C., a pressure of about 300 to about 1000 pounds per square inch gauge for about 15 minutes to about 10 hours to obtain the corresponding salt of a diarylcarbinol carboxylic acid.

4. A process for hydrogenating benzophenone 4,4'-dicarboxylic acid which comprises heating an aqueous solution of a sodium salt of said acid in the presence of hydrogen and a hydrogenation catalyst selected from the group consisting of cobalt, nickel and copper chromite at a temperature of about 100° to about 200° C., a pressure of about 300 to about 1000 pounds per square inch gauge for about 15 minutes to about 10 hours to obtain a compound selected from the group consisting of the corresponding salt of a diarylcarbinol carboxylic acid and the corresponding salt of a diarylmethane carboxylic acid.

References Cited by the Examiner

UNITED STATES PATENTS

| | | | |
|---|---|---|---|
| 2,137,407 | 11/38 | Lazier | 260—690 |
| 2,168,878 | 8/39 | Pasternack et al. | 260—535 |
| 3,058,997 | 10/62 | Taylor et al. | 260—525 XR |

OTHER REFERENCES

Adkins et al., J.A.C.S., 52, 4349–58 (November 1930) (QD 1 A5).

Adkins et al., J.A.C.S., 53 1091–5 (March 1931) (QD 1 A5).

Ellis, Hydrogenation of Organic Substances, 3rd ed., p. 218 (1919).

LORRAINE A. WEINBERGER, *Primary Examiner.*

CHARLES B. PARKER, LEON ZITVER, *Examiners.*